United States Patent
Bircher

Patent Number: 5,642,004
Date of Patent: Jun. 24, 1997

[54] POWER SUPPLY FOR STANDBY CIRCUITS OF ELECTRICAL DEVICES

[75] Inventor: Anton Bircher, Ennetbürgen, Switzerland

[73] Assignee: Helmut Fischer, Switzerland

[21] Appl. No.: 446,694

[22] PCT Filed: Oct. 4, 1994

[86] PCT No.: PCT/CH94/00197

§ 371 Date: Jun. 9, 1995

§ 102(e) Date: Jun. 9, 1995

[87] PCT Pub. No.: WO95/10875

PCT Pub. Date: Apr. 20, 1995

[30] Foreign Application Priority Data

Oct. 12, 1993 [CH] Switzerland ............... 3066/93

[51] Int. Cl.$^6$ ............................................. H02J 9/06
[52] U.S. Cl. ..................... 307/66; 307/43; 307/64; 364/707; 320/2; 320/11; 320/39; 320/43; 320/49; 320/54; 320/56
[58] Field of Search ............... 307/66, 64, 43; 364/707; 320/2, 39, 43, 49, 54, 56, 11

[56] References Cited

U.S. PATENT DOCUMENTS

| | | |
|---|---|---|
| 3,940,684 | 2/1976 | Heinzman et al. |
| 4,092,580 | 5/1978 | Prinsze ............................ 320/2 |
| 4,709,200 | 11/1987 | Ochiai . |
| 5,408,170 | 4/1995 | Umetsu et al. ................... 320/39 |
| 5,465,039 | 11/1995 | Narita et al. ..................... 320/32 |
| 5,471,114 | 11/1995 | Edwards et al. .................. 315/86 |
| 5,486,726 | 1/1996 | Kim et al. ....................... 307/120 |

FOREIGN PATENT DOCUMENTS

| | | |
|---|---|---|
| 4240351 | 9/1993 | Germany . |
| 2144932 | 3/1985 | United Kingdom . |

*Primary Examiner*—Jonathan Wysocki
*Assistant Examiner*—Albert W. Paladini
*Attorney, Agent, or Firm*—Speckman, Pauley & Fejer

[57] ABSTRACT

A power supply for standby circuits for an electrical consumer which separates both the electrical consumer and the power supply from the mains when in standby mode. The necessary power is supplied by a storage component backed up by an alternative voltage source. A voltage detector monitors the state of charge of the storage component and connects the circuit of the power unit to the mains as necessary. This power supply is suitable both for standby circuits of electrical consumers and for devices themselves or simply for control components and remote-control receivers on devices. Since a power unit is only connected to the mains when necessary, considerable energy savings are achieved.

10 Claims, 2 Drawing Sheets

POWER SUPPLY FOR STANDBY CIRCUITS OF ELECTRICAL DEVICES

BACKGROUND OF THE INVENTION

1. Field of the Invention

This invention relates to a power supply for standby circuits of electrical consumers.

2. Description of Prior Art

Many devices in the field of entertainment electronics and industry, such as television sets, radios, sound tapes, printers, photocopiers and machines, today have an emergency circuit, also known as a stand-by circuit. Such devices are continuously in a state of readiness. The standby circuits often provide signal monitoring elements of function signals. This can be an operating keyboard or a remote control receiver. The signal monitoring element is coupled with a switch which puts the device into operation or back into the standby mode. To keep the receiver of a remote control active 24 hours a day, a relatively large amount of energy is required even today, because the receiver is continuously connected with the electrical power supply via a power unit.

The same problem occurs with regard to various types of monitoring installations, identification of persons, as well as with battery charging devices, for example.

For example, in the standby mode a television set or a stereo system uses 7 to 10 W. Outside of an average switched-on operating time of three hours per day, 147 Wh (21 hours×7 W) are therefore used for the standby of the receiver alone. This results in a total of at least 53 kW/h per year.

Various devices remain connected to the electrical power supply even during prolonged non-use of the device, because the control device assures 24 hour monitoring. This connection with the electrical power supply exists also when unloaded primary cycled electrical power devices are connected with the electrical power supply. This causes unnecessary disruptions because of phase cuts and also involves, besides a large electrical current consumption, dangers connected with safety, for example, lightning damage, current surge by touching, and short circuits because of water damage.

However, today the operation of solar-powered calculators or watches already shows that considerable functions can be executed, even under artificial light, without energy from the electrical power supply. Surveys of the population have shown again and again that people are ready to conserve energy, but do not want to forego a certain standard of living. Thus the above described shortcomings must be resolved with the aid of technology.

SUMMARY OF THE INVENTION

It is one object of the invention to provide an economical power supply for standby circuits of electrical consumers, such as remote control receivers, monitoring systems, battery charging devices and the like, which is operated without energy from the electrical power supply and is only connected to the electrical power supply when it is demanded by the consumer connected with it.

BRIEF DESCRIPTION OF THE DRAWINGS

The current supply in accordance with one preferred embodiment of this invention will be described below in connection with the drawings, wherein.

DESCRIPTION OF PREFERRED EMBODIMENTS

Figure 1:
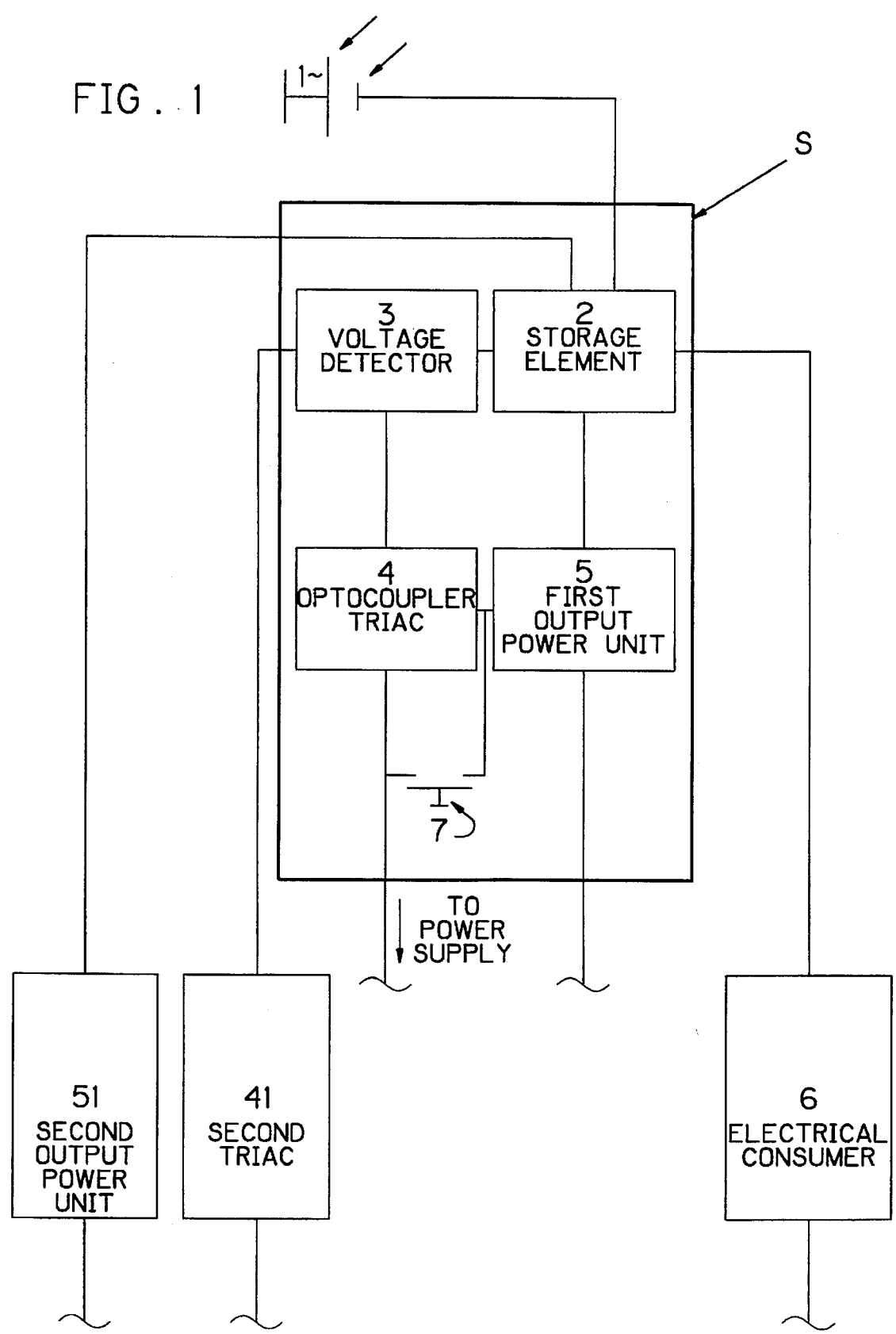
FIG. 1 shows a basic diagram of the controlled current supply, according to one preferred embodiment of this invention.

The current supply S of standby circuits of electrical devices in accordance with FIG. 1 has a power unit 5, a storage element 2, a voltage detector 3 monitoring the charged state of the storage element 2, and an optocoupler triac 4 controlled by the voltage detector 3, by which the power unit 5 can be cut off from the electrical power supply.

The secondary output of the power unit 5 is connected with the storage element 2. The voltage detector 3 controls the charged state of the storage element 2 and, if required, switches the optocoupler triac 4 on. The storage element 2 can be connected with an alternative voltage source 1. An electrical consumer 6 is supplied by the storage element 2. The electrical consumer 6 can be an electrical device, a remote control or an operating keyboard with operating switches for electrical devices, for example. An output power unit 51 can be connected and switched in an analogous manner by a triac 41 with the storage element 2, parallel with the power unit 5 of the power supply for standby circuits. A bypass switch such as pulse key 7 can be disposed on the power unit 5 so that the optocoupler triac 4 can be manually bypassed.

The storage element 2, in particular a battery or a capacitor according to one preferred embodiment of this invention, is monitored by an economical voltage detector 3. The power unit 5, for example an AC/DC converter, is only connected with the electrical power supply when a respective load requires energy. Thus an unloaded current supply S generally does not use any energy from the electrical power supply, however, to assure readiness, the current supply S is supplied at intervals by the power supply 5.

The electrical consumer 6 can be connected with the current supply S. In this case the electrical consumer 6 is supplied by the storage element 2. Thus, in the standby state the electrical consumer 6 does not require any energy from the electrical power supply and in this way saves an enormous amount of energy and does not represent a source of danger.

According to one preferred embodiment of this invention, the power unit 5 is switched in by an optocoupler, such as the optocoupler triac 4. A galvanic separation between the electrical power supply and the control of the current supply S can be assured in this way.

According to another preferred embodiment of this invention, the current supply S for a standby circuit has an alternative voltage source 1 for assisting the storage element 2. The alternative voltage source 1, for example a solar cell, supplies the energy for the current supply S of the standby circuit. Excess energy is stored in the storage element 2. The voltage detector 3 monitors the voltage at the storage element 2. The extremely low operating current for the voltage detector 3 and, if present, the electrical consumer 6 is provided by the storage element 2 or respectively from the alternative voltage source 1. If the voltage at the storage element 2 falls below a defined value, the power unit 5 is switched on by the voltage detector 3 via the optocoupler triac 4 until the storage element 2 has been sufficiently charged. A hysteresis input of the voltage detector 3 makes it possible to define a tolerable voltage fluctuation at the storage element 2. This allows the alternative voltage source 1 to operate within a defined tolerance. If, for example, a solar cell is used for charging the storage element 2, it is not necessary to continuously switch the power unit 5 off and on in case of changing light conditions. It is recommended to match the storage element 2 and the alternative voltage source 1 to the energy consumption of the electrical consumer 6. The current supply S of this invention, however, operates extremely economically, even with unmatched or badly matched elements and only makes available the required current from the electrical power supply.

The pulse key 7 always assures the renewed start of the current supply. Such renewed start is important in case of interruptions that occur because of damage to components, short circuits, following repairs or when replacing the storage element and the like. Further, the current supply S can also be operated without an alternative voltage source 1. The optocoupler triac 4 is bypassed by the pulse key 7 until the storage element 2 has been sufficiently charged and can take over the automatic function. Thus it is possible to start the current supply S even if the storage element 2 is depleted. When used as a battery charging device, the pulse key 7 is also important.

In accordance with another preferred embodiment of this invention, the current supply S can also be used as a battery charging device. The storage element 2 can be adapted to the conditions of the charge. When the circuit of the current supply S in accordance with this invention is used as a battery monitor, the storage element 2 can even represent the load, for example the battery to be charged. The extremely economical voltage detector 3 can be operated without a solar module directly by the battery charge to be monitored. As soon as the battery voltage falls below a predefined limit, the power unit 5 delivers the charge current. Thus, battery charging devices do not require standby current, according to one preferred embodiment of this invention.

The output current of the power unit 5 can be limited by a resistor. The resistor can have an effect on the time the power unit 5 is switched on and can also protect the connected load. This current limitation prevents damage by a short circuit.

According to yet another preferred embodiment of this invention, it is possible to control a second triac 41 or a relay by using a dual voltage detector as the voltage detector 3. Thus the current supply S in accordance with this invention can control an output circuit with a separate output power unit 51. When an electrical consumer 6 uses so much current that the power unit 5 is no longer sufficient, the voltage at the storage element 2 continues to fall below a defined level. The voltage detector 3 detects this situation and switches on the output power unit 51 in an analogous manner. The output power unit 51 is only connected with the electrical power supply as long as it is required.

The dual voltage detector can also be used for monitoring two independent storage elements. Such preferred embodiment according to this invention can be very effective when a load is operated with different currents, such as with radio transmitter sets, amplifiers, power supplies and the like.

The triac 41 can be provided with a zero passage circuit. Electrical power supply disruptions because of phase cuts can thus be prevented.

If the electrical consumer 6 is a control for another electrical consumer, for example a remote control, the circuit can be designed so that the triac 41 or the relay, and thus the output power unit 51, is switched by the remote control and not by the voltage detector 3.

A safety advantage can be achieved by constructing the power unit to be water-proof. Such a water-proof element can contain a separate transformer as well as the optocoupler triac 4.

An increased energy consumption is compensated from the electrical power supply by an AC/DC converter and/or an additional DC source.

Figure 2:
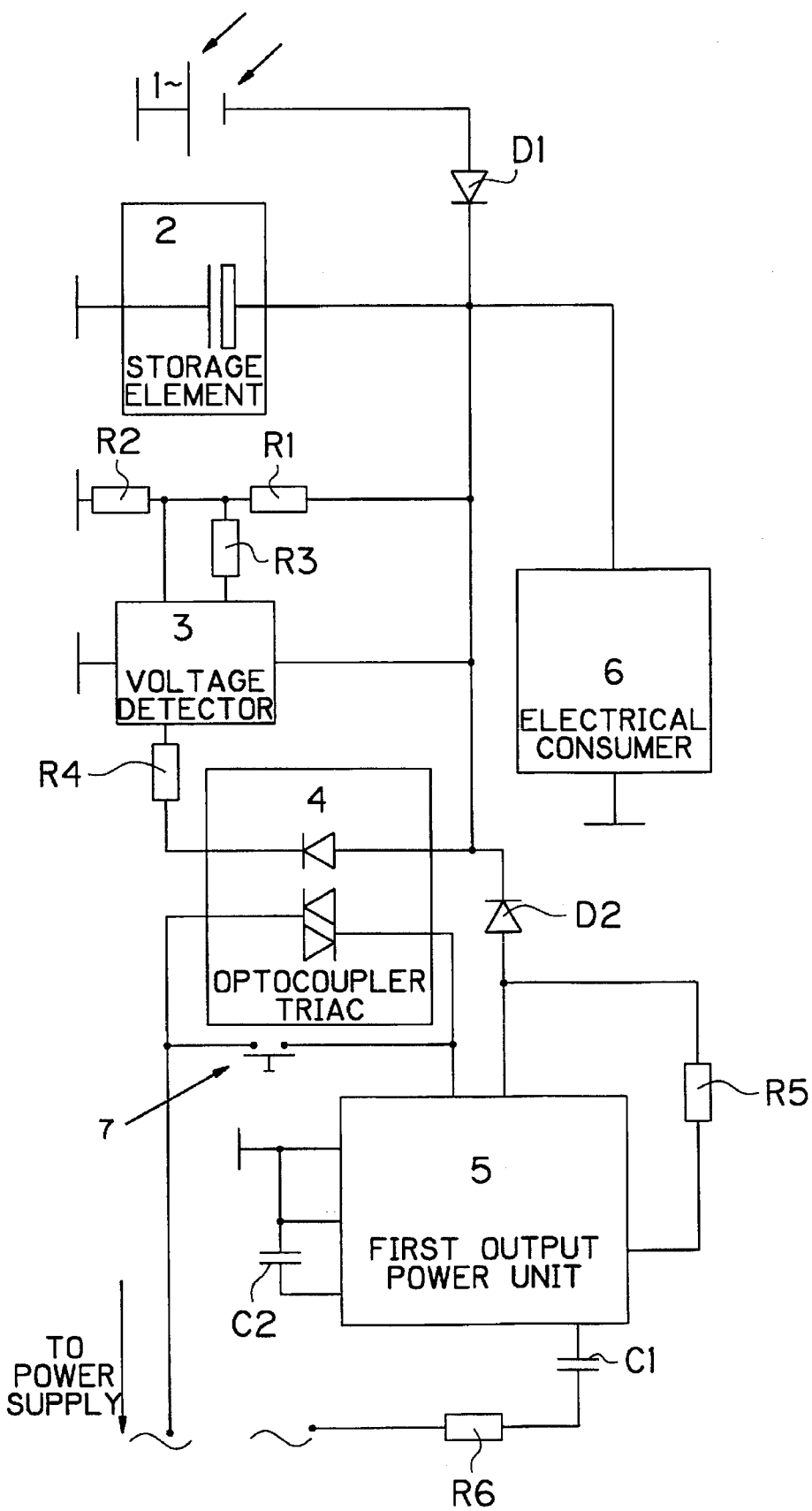
FIG. 2 shows an example of a circuit of the controlled current supply, according to one preferred embodiment of this invention.

An example of a circuit of a current supply S in accordance with one preferred embodiment of this invention is shown in FIG. 2. The positive side of the storage element 2 is connected by a diode D1 to the positive side of an alternative voltage source 1, such as a solar generator, and the storage element 2 is connected by a diode D2 to the positive side of the power unit 5. The electrical consumer 6 is directly connected to the storage element 2. The control element of the optocoupler triac 4 is connected between the output of the voltage detector 3 and the positive side of the storage element 2. The switching element of the optocoupler triac 4 is located in the primary circuit of the power unit 5 and bypassed by the pulse key 7 connected parallel with the optocoupler triac 4. The negative sides of the alternative voltage source 1, the storage element 2 and the voltage detector 3 are connected with each other. Such functional elements are matched in a manner known to those skilled in the art with resistors R1 to R6 and capacitors C1 and C2.

I claim:

1. A current supply (S) for a standby circuit of an electrical consumer (6) load comprising: a first output power unit (5) connected to and supplying all current of the electrical consumer (6) load when connected to the current supply (S), the current supply (S) having a storage element (2) which maintains a minimally charged condition, the storage element (2) connected to the first output power unit (5), a voltage detector (3) monitoring a charge state of the storage element (2), an optocoupler triac (4) controlled by the voltage detector (3), the optocoupler triac (4) connecting the first output power unit (5) to an electrical power supply, and the optocoupler triac (4) bypassable by a pulse key (7).

2. A current supply (S) in accordance with claim 1, characterized in that the storage element (2) is a battery.

3. A current supply (S) in accordance with claim 1, characterized in that the storage element (2) is a capacitor.

4. A current supply (S) in accordance with claim 3, wherein a current limiter is connected between the first output power unit (5) and the storage element (2).

5. A current supply (S) in accordance with one of claims 2 or 3, characterized in that it contains a second output power unit (51), which can be connected with the electrical power supply net by means of a second triac (41) or a relay (41').

6. A current supply (S) in accordance with one of claims 2 or 3, characterized in that an alternative voltage source (1) is connected with the storage element (2).

7. A current supply (S) in accordance with one of claims 1 to 6, characterized in that the voltage detector is a dual voltage detector.

8. Use of the current supply (S) in accordance with one of claims 1 to 6 as a battery charging device.

9. Use of the current supply (S) in accordance with one of claims 1 to 6 for supplying a receiver of a remote control.

10. A current supply (S) in accordance with claim 8, wherein the second output power unit (51) is controlled by one of the second triac (41) and the relay.

* * * * *

UNITED STATES PATENT AND TRADEMARK OFFICE
CERTIFICATE OF CORRECTION

PATENT NO. : 5,642,004
DATED : Jun. 24, 1997
INVENTOR(S) : Anton BIRCHER

It is certified that error appears in the above—identified patent and that said Letters Patent is hereby corrected as shown below:

On the title page, "10" claims should read--12 Claims--.

In Column 4, delete Claims 2-9 in their entirety and in their place insert:

2. A current supply (S) in accordance with claim 1, wherein the storage element (2) is a battery.

3. A current supply (S) in accordance with claim 1, wherein the storage element (2) is a capacitor.

4. A current supply (S) in accordance with claim 3, wherein a current limiter is connected between the first output power unit (5) and the storage element (2).

5. A current supply (S) in accordance with claim 3, further comprising a second output power unit (51) connected to the electrical power supply by one of a second triac (41) and a relay.

6. A current supply (S) in accordance with claim 3, wherein an alternative voltage source (1) is connected to the storage element (2).

7. A current supply (S) in accordance with claim 6, wherein the voltage detector (3) comprises a dual voltage detector.

8. A current supply (S) in accordance with claim 5, wherein the voltage detector (3) comprises a dual voltage detector.

9. A current supply (S) in accordance with claim 2, wherein a current limiter is connected between the first output power unit (5) and the storage element (2).

Add the following claims:

UNITED STATES PATENT AND TRADEMARK OFFICE
CERTIFICATE OF CORRECTION

PATENT NO. : 5,642,004
DATED : Jun. 24, 1997
INVENTOR(S) : Anton BIRCHER

It is certified that error appears in the above-identified patent and that said Letters Patent is hereby corrected as shown below:

11. A current supply (S) in accordance with claim 2, further comprising a second output power unit (51) connected to the electrical power supply by one of a second triac (41) and a relay.

12. A current supply (S) in accordance with claim 2, wherein an alternative voltage source (1) is connected to the storage element (2).

Signed and Sealed this

Twenty-seventh Day of January, 1998

*Attest:*

BRUCE LEHMAN

*Attesting Officer*  Commissioner of Patents and Trademarks